(12) United States Patent
Bandy et al.

(10) Patent No.: US 9,167,859 B2
(45) Date of Patent: Oct. 27, 2015

(54) SYSTEM FOR MOUNTING A HELMET-MOUNTED DEVICE TO A HELMET

(71) Applicant: EXELIS, INC., McLean, VA (US)

(72) Inventors: Gregory Seth Bandy, Roanoke, VA (US); William Eric Garris, Salem, VA (US); Timothy Trudeau, Roanoke, VA (US); Christopher Leitzsch, Roanoke, VA (US); Todd M. Neff, Salem, VA (US)

(73) Assignee: Exelis, Inc., McLean, VA (US)

( * ) Notice: Subject to any disclaimer, the term of this patent is extended or adjusted under 35 U.S.C. 154(b) by 289 days.

(21) Appl. No.: 13/798,757

(22) Filed: Mar. 13, 2013

(65) Prior Publication Data

US 2014/0259317 A1    Sep. 18, 2014

(51) Int. Cl.
*A42B 1/24*    (2006.01)
*A42B 3/04*    (2006.01)
*G02B 27/01*    (2006.01)

(52) U.S. Cl.
CPC ............... *A42B 3/0406* (2013.01); *A42B 3/04* (2013.01); *G02B 27/0176* (2013.01)

(58) Field of Classification Search
CPC .... A42B 3/042; A42B 3/0406; G02B 23/125; G02B 23/18; G02B 27/0176
USPC ................................................... 2/422, 6.6
See application file for complete search history.

(56) References Cited

U.S. PATENT DOCUMENTS

| 2,379,493 | A | | 7/1945 | Morehouse |
| 3,990,757 | A | | 11/1976 | Gill |
| 4,987,608 | A | | 1/1991 | Cobb |
| 5,467,479 | A | * | 11/1995 | Mattes ............................... 2/6.3 |
| 5,542,627 | A | | 8/1996 | Crenshaw et al. |
| 6,462,894 | B1 | * | 10/2002 | Moody ......................... 359/815 |
| 6,493,137 | B1 | * | 12/2002 | Solinsky et al. .............. 359/409 |
| 7,675,678 | B2 | * | 3/2010 | Woker et al. .................. 359/412 |
| 7,726,994 | B1 | | 6/2010 | Willey |
| 7,945,967 | B2 | * | 5/2011 | Barber et al. ....................... 2/6.2 |
| 8,209,780 | B1 | * | 7/2012 | Lemire ............................. 2/422 |
| 8,308,489 | B2 | | 11/2012 | Lee |
| 2007/0114252 | A1 | | 5/2007 | Gruebel et al. |
| 2007/0267757 | A1 | * | 11/2007 | Filipovich et al. ....... 250/214 VT |
| 2008/0263752 | A1 | * | 10/2008 | Solinsky et al. .................. 2/422 |
| 2010/0180364 | A1 | | 7/2010 | Willey et al. |
| 2010/0299814 | A1 | * | 12/2010 | Celona et al. ..................... 2/422 |
| 2011/0099695 | A1 | | 5/2011 | Siviter |
| 2011/0239354 | A1 | * | 10/2011 | Celona et al. ..................... 2/422 |
| 2012/0002046 | A1 | | 1/2012 | Rapoport et al. |

OTHER PUBLICATIONS

International Search Report for Corresponding International Patent Application No. PCT/US2014/020664, Issued June 12, 2014.

(Continued)

*Primary Examiner* — Clinton T Ostrup
*Assistant Examiner* — Jillian K Pierorazio
(74) *Attorney, Agent, or Firm* — RatnerPrestia

(57) ABSTRACT

Systems for mounting a helmet-mounted device to a helmet are disclosed. One such system comprises a frame configured to be movably coupled to the helmet, and an interconnect mechanism rotatably coupled to the frame. The interconnect mechanism is configured to receive the helmet-mounted device. The interconnect mechanism is rotatable relative to the frame between a use position for the helmet-mounted device and a stow position for the helmet-mounted device.

11 Claims, 5 Drawing Sheets

(56) References Cited

OTHER PUBLICATIONS

International Search Report for Corresponding International Patent Application No. PCT/US2014/021192, Issued Jun. 12, 2014.

Entire patent prosecution history of U.S. Appl. No. 13/798,739, filed Mar. 13, 2013, entitled, "Systems for Establishing Electrical Interconnections for Helmet-Mounted Devices."

* cited by examiner

SYSTEM FOR MOUNTING A HELMET-MOUNTED DEVICE TO A HELMET

FIELD OF THE INVENTION

The invention relates generally to helmet-mounted devices, and more particularly, to systems for mounting a helmet-mounted device to a helmet.

BACKGROUND OF THE INVENTION

Conventionally, helmets for use in tactical or military operations may include one or more helmet-mounted devices, such as lights, cameras, or vision enhancement apparatuses. These devices are removably attached to the helmet, and may receive power or electrical signals via their attachment to the helmet. In sensitive tactical or military operations, it may be desirable to quickly and reliably position helmet-mounted devices for use. Additionally, it may be desirable to quickly and easily stow helmet-mounted devices, e.g., by moving them out of the path of the user's vision. Accordingly, there exists a need for improvements in systems for mounting helmet-mounted devices to helmets.

SUMMARY OF THE INVENTION

Aspects of the present invention are directed to systems for mounting a helmet-mounted device to a helmet.

In accordance with one aspect of the present invention, a system for mounting a helmet-mounted device to a helmet is disclosed. The system comprises a frame configured to be movably coupled to the helmet, and an interconnect mechanism rotatably coupled to the frame. The interconnect mechanism is configured to receive the helmet-mounted device. The interconnect mechanism is rotatable relative to the frame between a use position for the helmet-mounted device and a stow position for the helmet-mounted device.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The embodiments of the invention described herein relate to mechanisms for mounting devices to helmets. The disclosed mechanisms provide for easy repositioning of a helmet-mounted device between use and stow positions. These mechanisms additionally allow for independent repositioning of helmet-mounted devices in situations where multiple helmet-mounted devices are used. Suitable devices for use with the present invention will be known to one of ordinary skill in the art from the description herein. These devices include, for example, lights, cameras, or vision enhancement apparatuses (such as night vision devices).

Figure 1A:
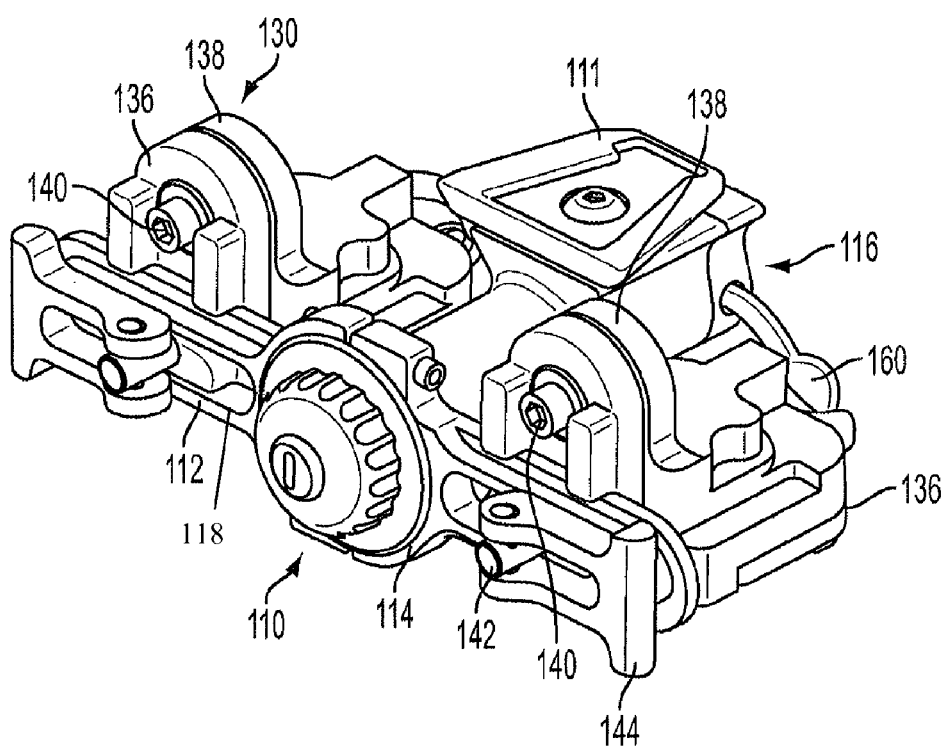
FIG. 1A is a diagram illustrating an exemplary system for mounting a helmet-mounted device to a helmet in accordance with aspects of the present invention
Figure 1B:
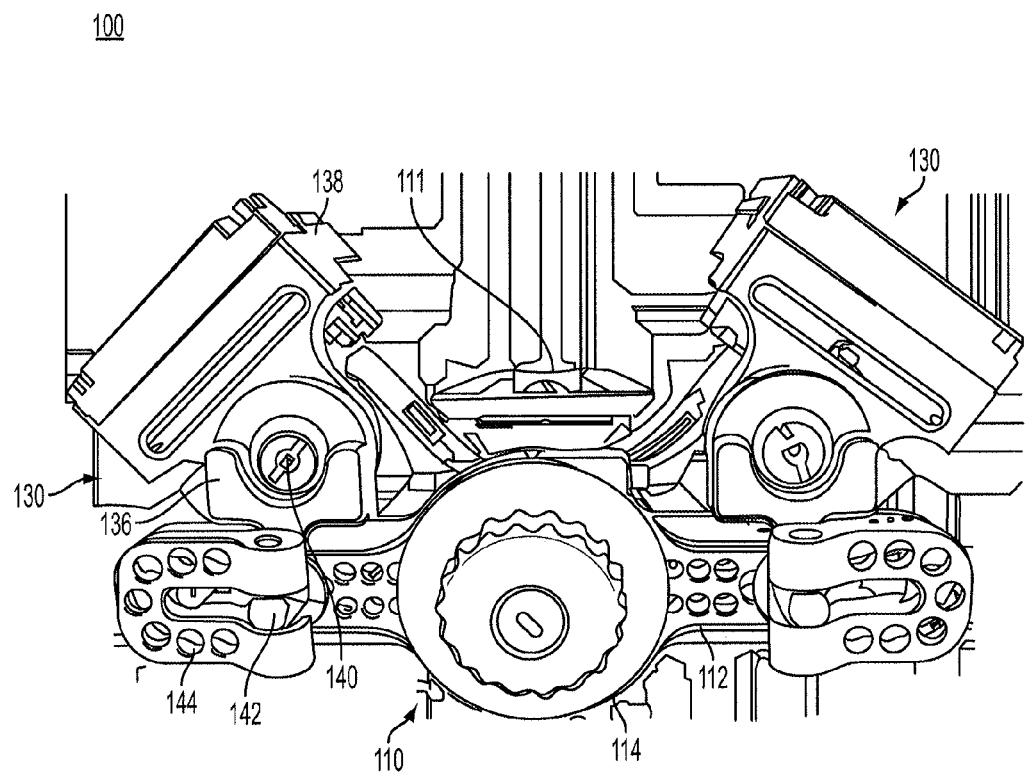
FIG. 1B is a diagram illustrating an alternate configuration of an interconnect mechanism of the system of FIG. 1A
Figure 1C:
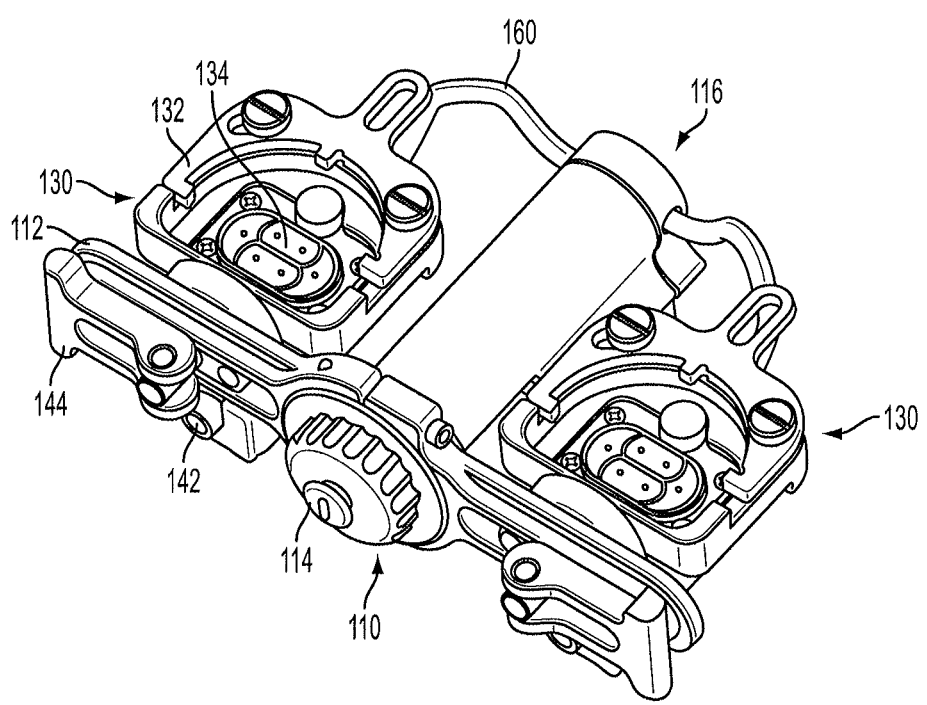
FIG. 1C is a diagram illustrating a reverse view of the system of FIG. 1A.

Referring now to the drawings, FIGS. 1A-1C illustrate an exemplary system 100 for mounting a helmet-mounted device to a helmet in accordance with aspects of the present invention. System 100 may be usable for mounting a night vision device to a helmet. As a general overview, system 100 includes a frame 110 and an interconnect mechanism 130. Additional details of system 100 are described herein.

Figure 2:
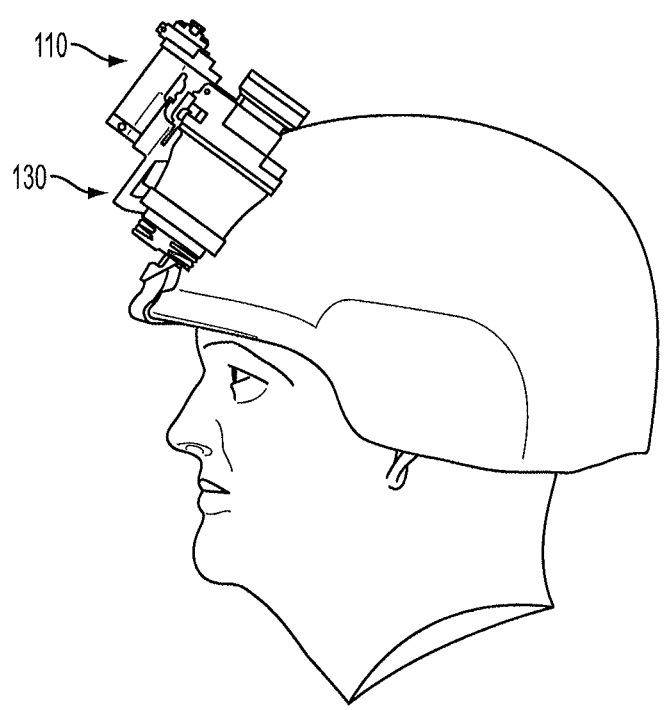
FIG. 2 is a diagram illustrating the exemplary system of FIG. 1A attached to a helmet.

Frame 110 is configured to be coupled to the helmet. In an exemplary embodiment, frame 110 includes a mounting mechanism 111 configured to be connected to the helmet. Mounting mechanism 111 is configured to movably couple frame 110 to the helmet. For example, frame 110 may be configured to be movable between a position in front of a user's face (e.g., for use when the helmet-mounted device is a night vision device) and a position above the user's face (e.g., when the night vision device is not in use). FIG. 2 illustrates frame 110 moved to a position above the user's face. Suitable structures for use as mounting mechanism 111 will be known to one of ordinary skill in the art from the description herein.

In an exemplary embodiment, frame 110 comprises an arm portion 112 extending outwardly from a base portion 114. Arm portion 112 extends horizontally across the user's face. As will be discussed in greater detail herein, arm portion 112 may be configured to be movable relative to base portion 114.

Frame 110 may further include a power source 116. Power source 116 may be provided in order to provide power to the helmet-mounted device(s) attached to interconnect mechanism 130. In an exemplary embodiment, power source 116 is contained within the base portion 114 of frame 110.

Interconnect mechanism 130 is rotatably coupled to frame 110. In an exemplary embodiment, interconnect mechanism is coupled to arm 112 of frame 110. Interconnect mechanism 130 is configured to receive and secure the helmet-mounted device. As shown in FIG. 1C, interconnect mechanism may include specialized projections 132 and electrical contacts 134 for effecting both mechanical and electrical attachment of the helmet-mounted device. Suitable structures for receiving and securing the helmet-mounted device are disclosed in U.S. patent application Ser. No. 13/798,739, filed concurrently with this application, the contents of which are incorporated herein by reference. Other suitable structures for receiving and securing the helmet-mounted device may be chosen based on the features of the helmet-mounted device, and will be known to one of ordinary skill in the art from the description herein.

Interconnect mechanism 130 is rotatable relative to frame 110 between a use position for the helmet-mounted device and a stow position for the helmet-mounted device. FIG. 1A illustrates interconnect mechanism 130 rotated to be in the use position (e.g., in which the user would be looking at or through the helmet-mounted device). FIG. 1B illustrates interconnect mechanism 130 rotated to be in the stow position.

In an exemplary embodiment, interconnect mechanism 130 comprises a fixed portion 136 and a moving portion 138. Moving portion 138 is coupled to fixed portion 136 via a rotational axis 140. In operation, moving portion 138 is rotated around rotational axis 140 to move the helmet-mounted device between the use position and the stow position. Interconnect mechanism 130 may be configured to be fixed in either the use position or the stow position. In an exemplary embodiment, fixed portion 136 and/or moving portion 138 may include a plurality of detents on surfaces thereof. The plurality of detents may be positioned to fix moving portion 138 in either the use position or the stow position.

Interconnect mechanism 130 is rotatable around an axis parallel to the operational axis of the helmet-mounted device, as shown in FIGS. 1A and 1B. For example, the operational axis of a night vision device is the axis extending between the inward facing viewing section and the outward facing lens, i.e., the axis along which the user looks. Rotational axis 140 of interconnect mechanism 130 is parallel to this operational axis. When the helmet-mounted device is coupled to interconnect mechanism 130, it is spaced from rotational axis 140. Accordingly, when interconnect mechanism 130 rotates around rotational axis 140, the helmet-mounted device is moved to a new position along a circumferential path.

Interconnect mechanism 130 may be slidingly coupled to frame 110, as shown in FIG. 1A. In an exemplary embodiment, a slot 118 is formed in arm 112. The slot may extend in a direction perpendicular to the axis of rotation of interconnect mechanism 130. In this embodiment, fixed portion 136 of interconnect mechanism 130 comprises a projection 142. Projection 142 is slidably positioned within slot 118. System 100 may further include a cam lock 144 for fixing the position of projection 142 within slot 118. In this embodiment, it is necessary to disengage cam lock 144 prior to moving projection 142, and then to reengage cam lock 144 following sliding movement of projection 142. Slidably coupling interconnect mechanism 130 to frame 110 may be desirable in order to accommodate different spacing between the eyes of different users. In other words, a user of system 100 may slidably reposition interconnect mechanism 130 along arm 112 of frame 110 so that when the helmet-mounted device is in the use position, it is properly positioned in front of the user's eye.

As shown in FIGS. 1A-1C, system 100 comprises a pair of interconnect mechanisms 130 rotatably coupled to frame 110—one for each of the user's eyes. Each interconnect mechanism 130 is configured to receive a respective helmet-mounted device. It will be understood by one of ordinary skill in the art that interconnect mechanisms 130 may be configured to receive the same or different types of helmet-mounted device, as desired by the user. In an exemplary embodiment in which both helmet-mounted devices are night vision devices, system 100 is configured to position each helmet-mounted device in front of a respective eye of the user. The user may then independently rotate each helmet-mounted device between use and stow positions, as desired.

Figure 3:
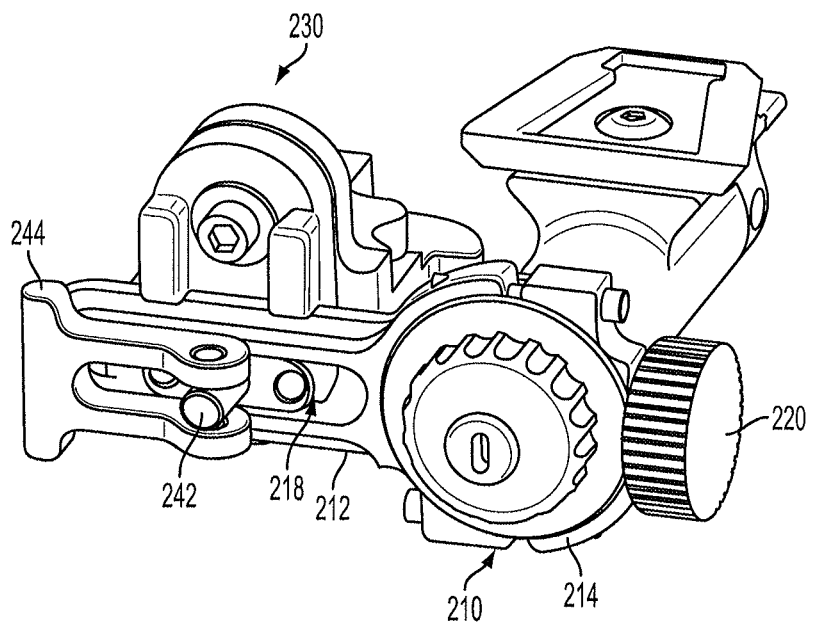
FIG. 3 is a diagram illustrating another exemplary system for mounting a helmet-mounted device to a helmet in accordance with aspects of the present invention.

FIG. 3 illustrates another exemplary system 200 for mounting a helmet-mounted device to a helmet in accordance with aspects of the present invention. As a general overview, system 200 includes a frame 210 and an interconnect mechanism 230. Frame 210 and interconnect mechanism 230 are substantially the same as those described above with respect to system 100.

System 200 differs from system 100 by including only a single interconnect mechanism 230. In an exemplary embodiment in which the helmet-mounted device is a night vision device, system 200 is configured to position the helmet-mounted device in front of one of the user's eyes.

System 200 may desirably be configured to position the helmet-mounted device in front of either one of the user's eyes, without removal or reattachment of the helmet-mounted device. In an exemplary embodiment, interconnect mechanism 230 is movable in such a way that the helmet-mounted device is positionable in front of either eye of the user. In this embodiment, arm portion 212 of frame 210 is rotatable around base portion 214. Arm portion 212 is rotatable between a left use position (shown in FIG. 3) and a right use position (opposite the position shown in FIG. 3). Arm portion 212 may be rotated by first actuating a thumb screw 220 to loosen or tighten the connection between arm portion 212 and base portion 214. In addition to rotation of arm portion 212, interconnect mechanism 230 may further be rotatably coupled to arm 212 such that interconnect mechanism 230 is rotatable 180 degrees between a left eye use position (shown in FIG. 3) and a right eye use position (opposite the position shown in FIG. 3). To rotate interconnect mechanism 230 between right eye and left eye use positions, a user first disengages cam lock 244, and slides projection 242 to an end of slot 218 distal from base portion 214 of frame 210. When projection 242 is positioned at the distal end of slot 218, interconnect mechanism 230 may be rotated around the outside edge of arm 212, to be positioned on the reverse side of arm portion 212 (e.g., the bottom side of arm portion 212 in FIG. 3). This reverse side will be the top side of arm portion 212 when arm portion 212 is rotated to the other eye position.

The electronics of the helmet-mounted devices may be specially designed to work with the above-described mounting systems. For example, helmet-mounted devices may be configured to power off when rotated into the stow position, or to power on when rotated into the use position. This automatic powering on and off of the helmet-mounted devices may be effected by internal sensors within the helmet-mounted device (e.g., accelerometers), or sensors monitoring the position of the interconnect mechanism.

Additionally, system 100 may further include electrical connections 160 for enabling shared communication between the two helmet-mounted devices. Electrical connections 160 may be configured operatively link the helmet-mounted devices through control signals received via electrical contacts 134. In an exemplary embodiment, electrical connections 160 enable one helmet-mounted device to power on or power off the other helmet-mounted device, or to change an operating mode of the helmet-mounted device.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for mounting a helmet-mounted optical device having an optical axis to a helmet, the system comprising:
   a base portion configured to be movably coupled to the helmet;
   a frame coupled to the base portion and configured to rotate about an axis that is parallel to the optical axis between a first rotational position corresponding to a right-eye position for the frame and a second rotational position corresponding to a left-eye position for the frame; and
   an interconnect mechanism moveably coupled to the frame, said interconnect mechanism including a first portion translationally coupled to the frame by a slot and projection arrangement for adjusting a pupillary distance of the system, the first portion slideably coupled to the frame and configured to move the helmet-mounted optical device between a right-eye device position and a left-eye device position offset from the right-eye device position, the helmet mounted optical device directly mounted to a second portion of the interconnect mechanism, the second portion rotatably coupled to the first portion about the optical axis for rotating the helmet mounted optical device with respect to the first portion between a device use position for the helmet-mounted optical device and a stow position for the helmet-mounted optical device.

2. The system of claim 1, wherein the frame is configured to be movable between a position in front of a user's face and a position above the user's face.

3. The system of claim 1, wherein the interconnect mechanism is rotatable around an axis parallel to an operational axis of the helmet-mounted device.

4. The system of claim 1, wherein the interconnect mechanism is configured to be fixed in either the use position or the stow position.

5. The system of claim 1, wherein the interconnect mechanism is slidingly coupled to the frame.

6. The system of claim 1, further comprising a power source contained within the frame.

7. The system of claim 1, wherein the system comprises a pair of interconnect mechanisms rotatably coupled to the frame, each of the pair of interconnect mechanisms configured to receive a respective helmet-mounted device to form a binocular device.

8. The system of claim 7, wherein the use position for each helmet-mounted device is in front of a respective eye of a user.

9. The system of claim 1, wherein the system comprises no more than one interconnect mechanism.

10. The system of claim 9, wherein the use position for the helmet-mounted device is in front of an eye of a user.

11. The system of claim 10, wherein the interconnect mechanism is movable such that the helmet-mounted device is positionable in front of either eye of the user.

* * * * *